United States Patent
Sahin et al.

(10) Patent No.: US 11,154,056 B2
(45) Date of Patent: Oct. 26, 2021

(54) ANTIMICROBIAL SURFACE COATING MATERIAL

(71) Applicant: YEDITEPE UNIVERSITESI, Istanbul (TR)

(72) Inventors: Fikrettin Sahin, Istanbul (TR); Zeynep Iyigundogdu, Istanbul (TR); Okan Demir, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 0 days.

(21) Appl. No.: 15/771,391

(22) PCT Filed: Oct. 21, 2016

(86) PCT No.: PCT/TR2016/050396
§ 371 (c)(1),
(2) Date: Apr. 26, 2018

(87) PCT Pub. No.: WO2017/074285
PCT Pub. Date: May 4, 2017

(65) Prior Publication Data
US 2019/0075791 A1    Mar. 14, 2019

(30) Foreign Application Priority Data
Oct. 26, 2015 (TR) .................... 2015/13357

(51) Int. Cl.
*A01N 31/16* (2006.01)
*A01N 47/44* (2006.01)
*A01N 43/40* (2006.01)

(52) U.S. Cl.
CPC ............. *A01N 31/16* (2013.01); *A01N 43/40* (2013.01); *A01N 47/44* (2013.01)

(58) Field of Classification Search
None
See application file for complete search history.

(56) References Cited

U.S. PATENT DOCUMENTS 6,013,677 A * 1/2000 Dyer ...................... A61K 8/347
424/61
2003/0077316 A1   4/2003 Nichols et al.
(Continued)

FOREIGN PATENT DOCUMENTS

JP     2008110999 A    5/2008
JP     2008111000 A    5/2008
(Continued)

OTHER PUBLICATIONS

Shintre M S et al: "Efficacy of an alcohol-based healthcare hand rub containing synergistic combination of farnesol and benzethonium chloride", International Journal of Hygiene and Environmental Health, Urban U. Fischer, Jena, DE, vol. 209, No. 5, Sep. 25, 2006 (Sep. 25, 2006), pp. 477-487, XP028043393, ISSN: 1438-4639, DOI: 10.1016/J.IJHEH.2006.04.006 [retrieved on Sep. 25, 2006] p. 478: left column first paragraph and right column, first and second paragraphS; p. 479: left column, first paragraph and table 1.

(Continued)

*Primary Examiner* — Dominic Lazaro
(74) *Attorney, Agent, or Firm* — Bayramoglu Law Offices LLC

(57) ABSTRACT

The present invention relates to surfaces which are featured with antimicrobial property. Combinations made with zinc pyrithione, chlorhexidine gluconate and/or triclosan are used in the invention. The invention enables to prevent biodegradation or biocontamination occurring on surfaces. In sectors where surface coating materials are widely used, the pathogen factors (bacteria, yeasts and fungi), which are the causes of surface-borne hygiene, allergy and infectious diseases, are controlled.

1 Claim, 2 Drawing Sheets

(56) References Cited

U.S. PATENT DOCUMENTS

Figure 1:
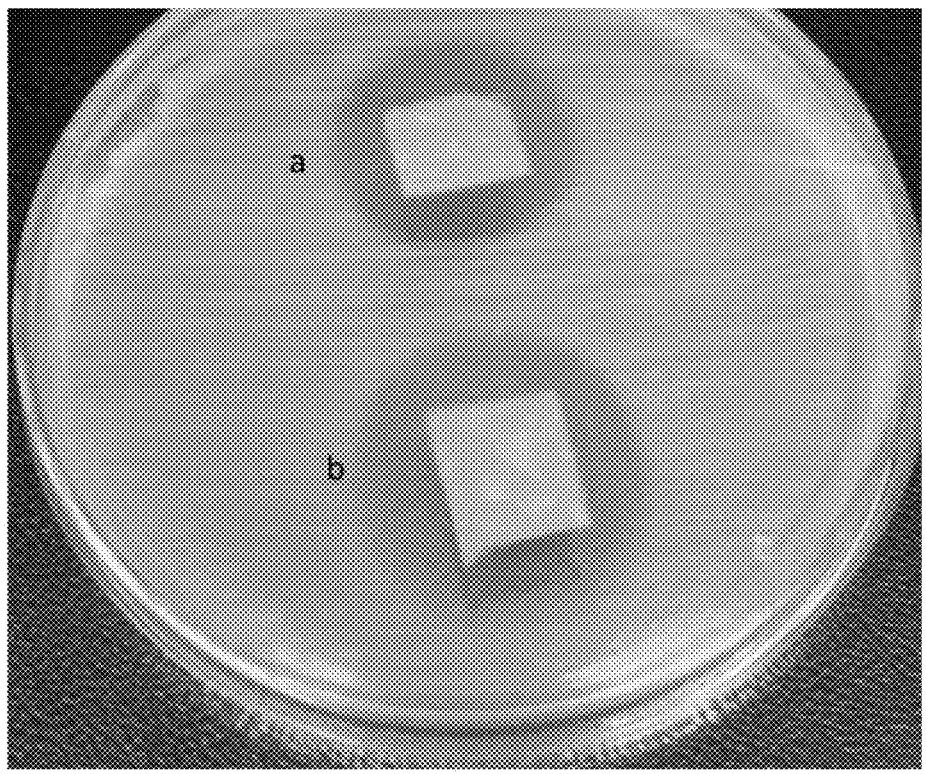

| | | | |
|---|---|---|---|
| 2006/0034902 A1 | 2/2006 | Cormier et al. | |
| 2006/0068662 A1* | 3/2006 | Hanrahan | A01N 31/04 442/123 |
| 2011/0290259 A1* | 12/2011 | McGuire, Jr. | A61B 46/40 128/849 |
| 2012/0328682 A1 | 12/2012 | Bardwell et al. | |
| 2013/0156708 A1 | 6/2013 | Pesaro et al. | |
| 2014/0235727 A1 | 8/2014 | Tufts et al. | |
| 2015/0224225 A1 | 8/2015 | Ferreira et al. | |

FOREIGN PATENT DOCUMENTS

| | | | |
|---|---|---|---|
| WO | 03028762 A1 | 4/2003 | |
| WO | WO-03028762 A1 * | 4/2003 | A61K 45/06 |

OTHER PUBLICATIONS

Verdier, T.,Coutand, M., Bertron, A., &Roques, C. (2014). A review of indoor microbial growth across building materials and sampling and analysis methods. Building and Environment, 80, 136-149. http://www.artvin.edu.tr/files/user_files/129/files/KPSS/grvykslm/1-%20Mobilya%20ve%20Ahsap-Yapay%20Malzeme.docx.

Nemli,G., Aydin, A.,Öztürk, i. (2004). Laminat Malzemelerde Dizayn Seçnekleri. Kafkas Üniversitesi Artvin Orman Fakültesi Dergisi: 1-2, 96-101.

Tamburini, E.,Donegà, V., Marchetti, M. G., Pedrini, P., Monticelli, C., &Balbo, A. (2015). Study on Microbial Deposition and Contamination onto Six Surfaces Commonly Used in Chemical and Microbiological Laboratories. International journal of environmental research and public health, 12(7), 8295-8311.

Charles River, Microbial Hotspots and Diversity on Common Household Surfaces, 2014, http://www.criver.com/files/pdfs/emd/accugenix/microbial_hotspots_and_diversity_on_common_househo.aspx.

Scott, E., & Bloomfield, S. F. (1990). The survival and transfer of microbial contamination via cloths, hands and utensils. Journal of Applied Bacteriology,68(3), 271-278.

Lalitha, M. K. and T. N. Vellore, "Manual on antimicrobialsusceptibilitytesting", URL: http://www. ijmm. org/documents/Antimicrobial. doc, 2005.

* cited by examiner

ANTIMICROBIAL SURFACE COATING MATERIAL

CROSS REFERENCE TO THE RELATED APPLICATIONS

This application is the national phase entry of International Application No. PCT/TR2016/050396, filed on Oct. 21, 2016, which is based on and claims priority to Turkish patent application no. 2015/13357, filed on Oct. 26, 2015, the entire contents of which are incorporated herein by reference.

TECHNICAL FIELD

The present invention relates to a surface coating material which is featured with antimicrobial (anticandidal, antibacterial, antifungal) property.

BACKGROUND

It is known that one of the main reasons of deterioration of the indoor air quality in humid and indoor environments is microorganisms. Air quality degradation and the metabolic wastes and spores, produced by the airborne microorganisms, which mix with the air, may cause serious health problems for humans. The materials used in construction materials are generally multi-porous materials. Humid air may provide a suitable environment for the microorganisms to grow and reproduce on the said materials.

7-8 mm thickness Medium density fiberboard (MDF), high density fiberboard (HDF) or particle board surfaces which are more inexpensive than classic wood, are coated with the purpose of improving physical and mechanical properties, making them resistant against chemicals, providing a decorative appearance and preventing wear out. Materials used for this purpose are divided into two as solid (laminated boards, laminates) and liquid (lacquer paint, printing processes) surface coating materials.

Inner (middle) layers of the laminate material is composed of special quality papers which are saturated with phenolic resin and printed in desired color and design, and the upper layer or layers thereof are composed of decorated printed paper layer(s) treated with amino plastic resin (melamine formaldehyde).

However, since laminate surfaces are not antimicrobial, they cause risk of disease via transmission of microorganisms between surfaces or direct transfer thereof to humans. There are previous studies about the microbial load growth on laminate surfaces. In the study by Tamburini et al., microbial deposition and contamination on six different surfaces (glass, stainless steel, porcelain, post-forming laminate, high-performing laminate and enamel steel) used in chemical and microbiological laboratories were examined, and it was stated that while the lowest microorganism concentration was observed on porcelain surfaces, the highest microorganism concentration was observed in post-forming laminate and high-performing laminate surfaces.

In an article published by Charles River Laboratories, household surfaces were examined and it was stated that stainless steel and laminate surfaces were the surfaces that accommodated the highest microorganism diversity.

In a study by Scott and Bloomfield, the survival of bacteria on laminate surfaces used in kitchens and transfer thereof to other surfaces were examined, and it was stated that Gram-positive and Gram-negative bacteria survived for up to 24 hours on contaminated surfaces and caused a potential risk of poisoning if in contact with food.

United States patent document no. US2015224225 discloses an antimicrobial coating material. The said coating contains antimicrobial peptide and nanoparticles and can be used in medical equipment and laboratory surfaces.

SUMMARY

An objective of the present invention is to provide an antibacterial surface coating material.

Another objective of the present invention is to provide an antifungal surface coating material.

A further objective of the present invention is to provide an anticandidal surface coating material.

Another objective of the present invention is to provide a surface coating material which prevents biodegradation or biocontamination.

Another objective of the present invention is to provide a surface coating material having an easy and low cost production.

A further objective of the present invention is to provide a surface coating material which enables to control pathogen microorganisms and agents causing surface-borne allergic and infectious diseases and to reduce potential diseases.

Another objective of the present invention is to provide a long lasting surface coating material which prevents biocorrosion and biodegradation.

Another objective of the present invention is to provide a surface coating material which does not cause any toxic or irritant effect on human body.

DETAILED DESCRIPTION

"Antimicrobial surface coating material" developed to fulfill the objectives of the present invention is illustrated in the accompanying figures, and the details of these figures are listed below.

The abbreviations used in the experimental studies are as follows: Zinc Pyrithione "ZP", Triclosan "T", Chlorhexidine gluconate "CG".

The surface coating material is applied on laminate surfaces in the experiments.

FIG. 1-a: 1% CG and 0.2% T,
b: is the view of activity of 1% ZP added laminate surfaces against *Staphylococcus aureus*.

Figure 2:
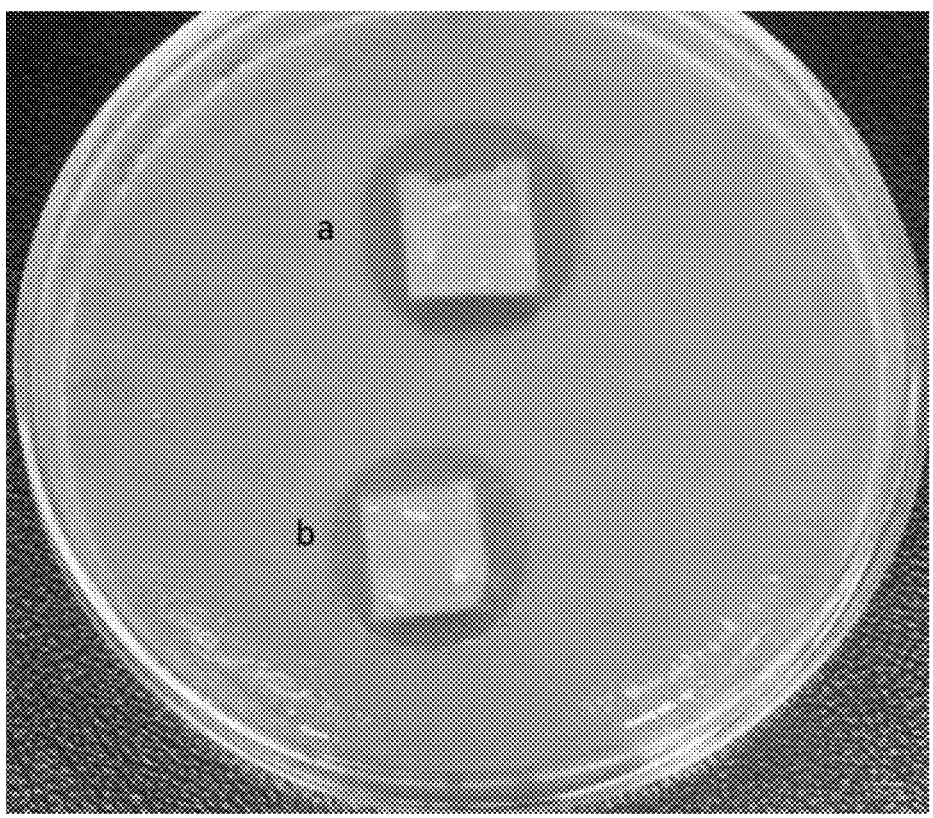

FIG. 2—a and b are the views of the activity of laminate surfaces against *Escherichia coli*.

Figure 3:
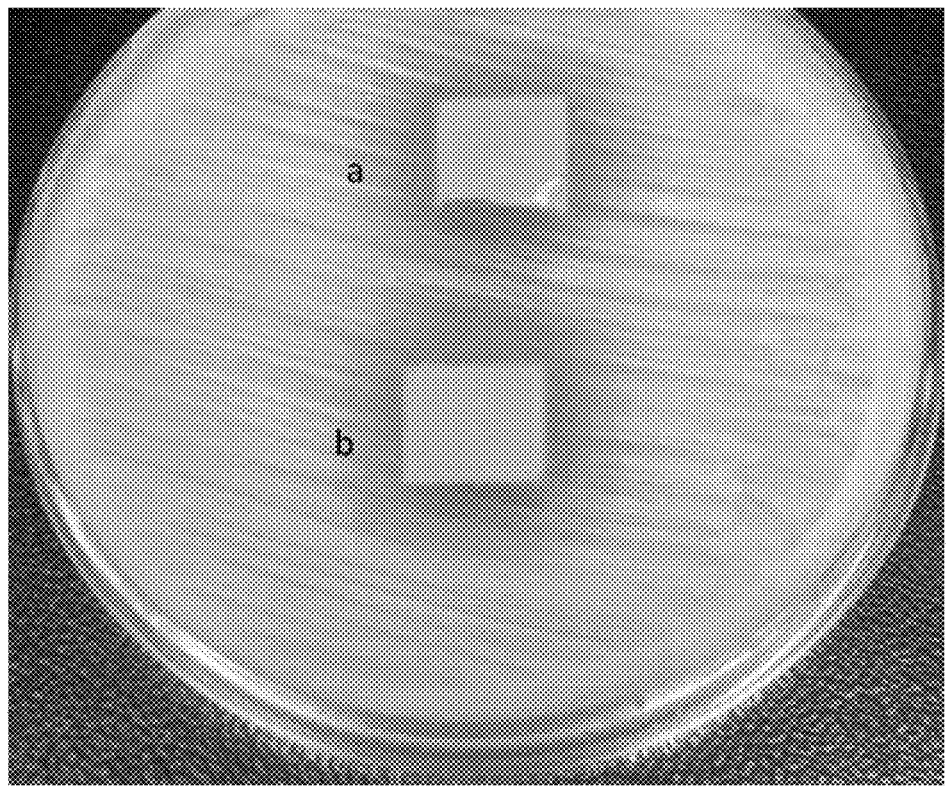

FIG. 3—a and b are the views of the activity of the laminate surfaces against *Candida albicans*.

Figure 4:
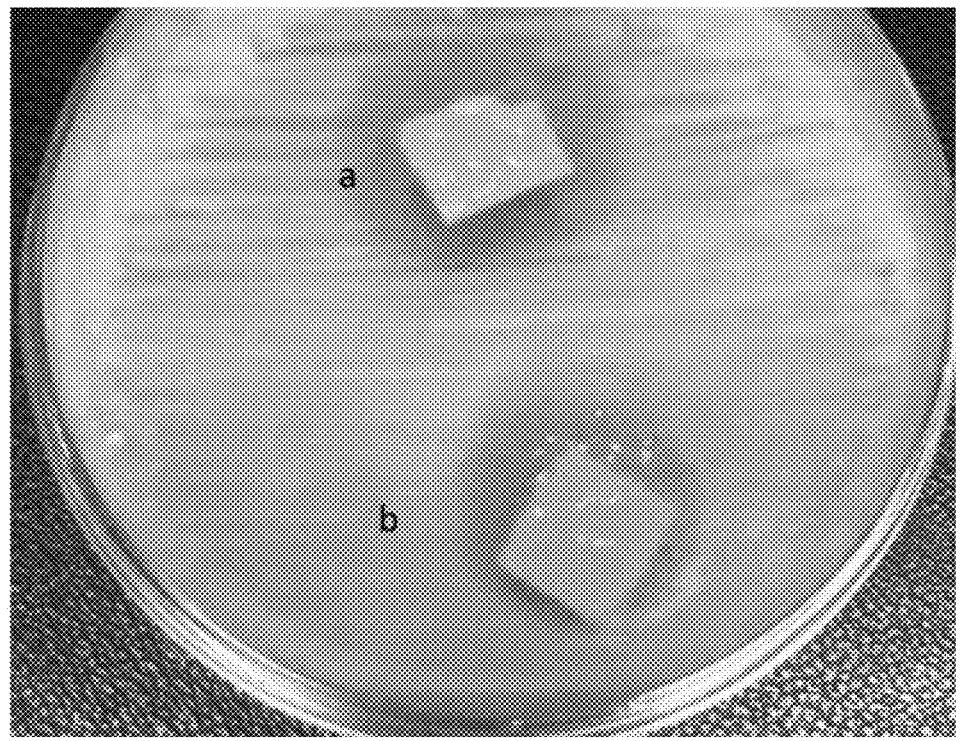

FIG. 4—a and b are the views of the activity of laminate surfaces against *Aspergillus niger*.

EXPERIMENTAL STUDIES

In the embodiment of the present invention; surface coating materials are obtained by mixing different concentrations and combinations of zinc pyrithione, chlorhexidine gluconate and triclosan with resin and impregnating printed paper with it under a specific pressure and temperature.

Antimicrobial Tests

Modified disk diffusion method: Standard NCCLS disc diffusion method was used upon being modified in order to determine the antimicrobial activity of CG, T and ZP on each microorganism that is being tested. The 100 µl solution including $10^8$ cfu/ml bacteria, $10^6$ cfu/ml yeast and $10^4$ spor/ml fungi was prepared with fresh cultures and inoculated with spreading method on Nutrient Agar (NA), Sabouraud Dextrose Agar (SDA) and Potato Dextrose Agar (PDA), respectively. 20 µl of sterile water was dropped on the empty discs, and was immersed into powder triclosan. 20 µl of chlorhexidine gluconate and zinc pyrithione were drawn and impregnated to the empty discs and placed on the inoculated petri dishes. Empty discs with 20 µl drop of sterile water were used as negative control. Ofloxacin (10 µg/disc) and nystatin (30 µg/disc) were used as positive control for bacteria and fungi, respectively. The petri dishes, which were inoculated and on which modified disc diffusion method was applied, were incubated for 24 hours for bacteria and 48 hours for yeasts at 36±1° C., and for 72 hours for fungi at 25±1° C. Antimicrobial activity against microorganisms tested with modified disc diffusion method was assessed by measuring the inhibition zone (area where microorganisms do not grow). Antimicrobial activity test results of the tested CG, T and ZP are summarized in Table 1. All tests were repeated at least twice.

Preparing the surface coating material comprising chlorhexidine gluconate, zinc pyrithione and/or triclosan To the mixture of melamine formaldehyde, resin and hardener, 1% by weight of chlorhexidine gluconate was added in the melting tank. In the impregnation stage of the production of the surface coating material, application was performed such that there would be 56-60% by mass of resin mixture per m$^2$ and that viscosity would be 14-15 cP. At a temperature of 23-28° C. and under the influence of 100 bar/m$^2$ pressure, craft papers were impregnated with resin, melamine formaldehyde and chlorhexidine gluconate and thereby the surface coating material containing 1% active ingredient was made antimicrobial. If the temperature of the resin mixture drops below 23° C., it is reheated. The agitator was operated in order to prevent occurrence of any precipitation in the resin coating tank. In the impregnation stage, rotation speed was adjusted to 17 m/min. The said obtained surfaces were subjected to antimicrobial activity tests.

In the embodiment of the invention, preferably a combination of chlorhexidine gluconate (0.01-5%), zinc pyrithione (0.005-10%) and triclosan (0.01-1%) was used as the active ingredient.

Antimicrobial activity tests of the prepared surface coating materials;

Antimicrobial activity tests for antimicrobial surface coating materials were performed simultaneously using two different methods.

In the first test method; isolates from the bacteria *Escherichia coli, Staphylococcus aureus, Pseudomonas aeruginosa*; the yeasts *Candida albicans* and *Candida glabrata* and the fungi *Aspergillus niger, Botrytis cinerea, Fusarium oxysporum, Penicillium vinaceum, Penicillium expansum* were inoculated on petri dishes containing suitable media (NA, SDA and PDA respectively). Surface coating materials prepared at sizes of 1×1 cm were placed on the inoculated petri dishes. The inoculated petri dishes were incubated for 24 hours for bacteria and 48 hours for yeasts at 36±1° C. and 72 hours for fungi at 25±1° C. Antimicrobial activities of the surface coating materials were assessed by the inhibition zone (area where microorganisms do not grow) formed around them.

In the second method, 1 ml medium was poured on surface coating materials of 5×5 cm placed on empty petri dishes. The media placed on the surfaces were contaminated by 100 µl of the solutions (containing 10$^8$ cfu/ml bacteria, 10$^6$ cfu/ml yeast and 10$^3$ spore/ml fungi) prepared from the fresh media within the buffer solution, and sterilized plastic films of 4×4 cm were placed thereon such that the media was prevented from overflowing. The contaminated surface coating materials were incubated for 24 hours for bacteria and 48 hours for yeasts at 36±1° C. and 72 hours for fungi at 25±1° C. The tested surface coating materials were washed with 10 ml PBS solution and upon performing reisolation via serial dilution method it was determined whether there was microbial growth thereon.

Experimental studies were carried out with certain fungus, yeast and bacteria species. Among these microorganisms, the bacteria were *Escherichia coli, Staphylococcus aureus, Pseudomonas aeruginosa*, MRSA and VRE. The yeasts used in the experimental studies were *Candida albicans* and *Candida glabrata* and the fungi used in the same were *Fusarium oxysporum, Botrytis cinerea, Penicillium* spp. and *Aspergillus niger*.

Experimental Results

Antimicrobial test results:

Antimicrobial activity test results of the tested triclosan, chlorhexidine gluconate and zinc pyrithione are summarized in Table 1. All tests were repeated at least twice.

TABLE 1

Antimicrobial activity of zinc pyrithione (ZP), triclosan (T), chlorhexidine gluconate (CG), positive control (PC) and negative control (NC) on the tested microorganisms.

| Microorganisms | Chemicals | | | | |
|---|---|---|---|---|---|
| | ZP | T | CG | PC | NC |
| BACTERIA | | | | | |
| Vancomycin-resistant *Enterococcus* (VRE) | + | + | + | + | − |
| Methicillin-resistant *Staphylococcus aureus* (MRSA) | + | + | + | + | − |
| *Escherichia coli* | + | + | + | + | − |
| *Staphylococcus aureus* | + | + | + | + | − |
| *Pseudomonas aeruginosa* | + | + | + | + | − |
| YEASTS | | | | | |
| *Candida albicans* | + | − | + | + | − |
| *Candida glabrata* | + | − | + | + | − |
| FUNGI | | | | | |
| *Aspergillus* spp. | + | − | + | + | − |
| *Fusarium oxysporum* | + | − | + | + | − |
| *Botrytis cinerea* | + | − | + | + | − |
| *Penicillium* spp. | + | − | + | + | − |

Antimicrobial activities of the surface coating materials of the present invention were tested by using bacteria (*Escherichia coli, Staphylococcus aureus, Pseudomonas aeruginosa*, MRSA and VRE), yeast (*Candida albicans* and *Candida glabrata*) and fungus (*Aspergillus niger, Botrytis cinerea, Fusarium oxysporum* and *Penicillium* spp.) isolates. According to the obtained results; it was observed that laminate surfaces containing triclosan and chlorhexidine gluconate had antimicrobial activity on all of the tested microorganisms. Developed antimicrobial activity test results are summarized in Table—2. Example images related to the antimicrobial activity test results are given in FIGS. 1-4. According to these figures, antimicrobial activities of the laminate surfaces of the present invention were proved by the inhibition zone formed around them (FIGS. 1-4).

TABLE 2

Antimicrobial activity of laminates containing Zinc pyrithione (ZP), Triclosan (T), Chlorhexidine gluconate (CG) and combinations thereof on the tested microorganisms.

| Microorganisms | Combination | | | | | | | | NC |
|---|---|---|---|---|---|---|---|---|---|
| | 1 | 2 | 3 | 4 | 5 | 6 | 7 | 8 | |
| BACTERIA | | | | | | | | | |
| Escherichia coli | +[a] | + | + | + | + | + | + | + | −[b] |
| Staphylococcus aureus | + | + | + | + | + | + | + | + | − |
| Pseudomonas aeruginosa | + | + | + | + | + | + | + | + | − |
| MRSA | + | + | + | + | + | + | + | + | − |
| VRE | + | + | + | + | + | + | + | + | − |
| YEASTS | | | | | | | | | |
| Candida albicans | + | + | + | + | + | + | + | + | − |
| Candida glabrata | + | + | + | + | + | + | + | + | − |
| FUNGI | | | | | | | | | |
| Aspergillus niger | + | + | + | + | + | + | + | + | − |
| Botrytis cinerea | + | + | + | + | + | + | + | + | − |
| Fusarium oxysporum | + | + | + | + | + | + | + | + | − |
| Penicillium spp. | + | + | + | + | + | + | + | + | − |

[a] + sign indicates that the boron compounds had antimicrobial activity.
[b] − sign indicates that there is no antimicrobial activity.
1: laminate containing 1% CG and 0.2% T
2: laminate containing 1% ZP and 1% CG
3: laminate containing 1% CG, 0.2% T and 1% ZP
4: laminate containing 0.1% T and 2% CG
5: laminate containing 2% CG and 0.3% T
6: laminate containing 3% ZP and 0.2% T
7: laminate containing 2% CG, 3% ZP and 0.2% T
8: laminate containing 2% ZP, 1% CG and 0.3% T
NC: Negative control; laminate not containing any additives In the second antimicrobial activity method that is applied, no microbial growth was observed in the surface coating materials on which reverse isolation was applied.

The surface coating material of the present invention is used in all interior decorations and in all materials on which coating is applied such as all fixed and movable furniture, building facade coating, hotel decorations, wet areas (toilet, shower and changing cabins), doors, telora (insert frame) cabinets, separation cabinets, office decorations and office furniture, kitchen and bathroom cabinet doors, counters and benches, wall coating, column coating, ceiling coating, hospital, laboratory furniture, school furniture, white/black boards, direction boards. The said antimicrobial laminate material does not cause any toxic or irritant effect on human body.

The invention claimed is:

1. An antimicrobial surface coated material, comprising 1-2% by weight of chlorhexidine gluconate, 1-3% by weight of zinc pyrithione and 0.1-0.3% by weight of triclosan, wherein the antimicrobial surface coated material further comprises melamine formaldehyde, wherein the antimicrobial surface coated material further comprises an impregnated printed paper;
wherein the impregnated printed paper is a craft paper, and in an impregnation stage to produce the antimicrobial surface coated material, the craft paper is impregnated with a resin mixture of the zinc pyrithione, the chlorhexidine gluconate, the triclosan, and the melamine formaldehyde at a temperature of 23-28° C. and under a pressure of 100 bar.

* * * * *